Aug. 12, 1941.            J. N. KIRTON                2,252,429
                       EMERGENCY TIRE CHAIN
                        Filed Oct. 24, 1939
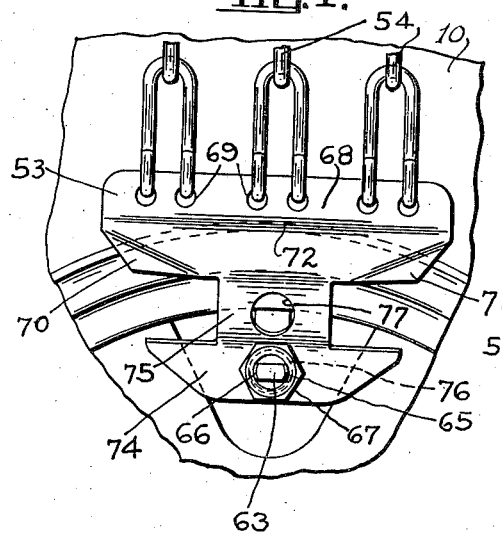
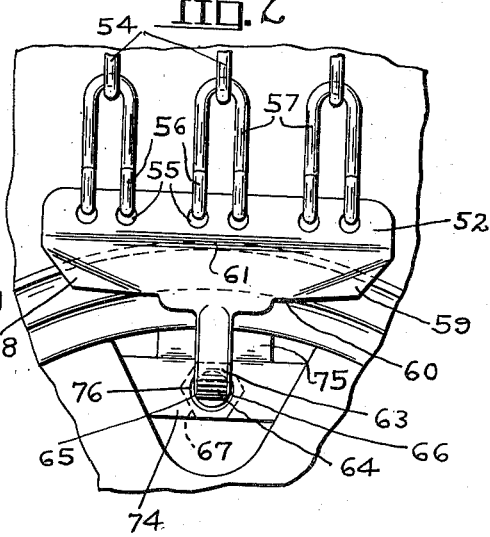
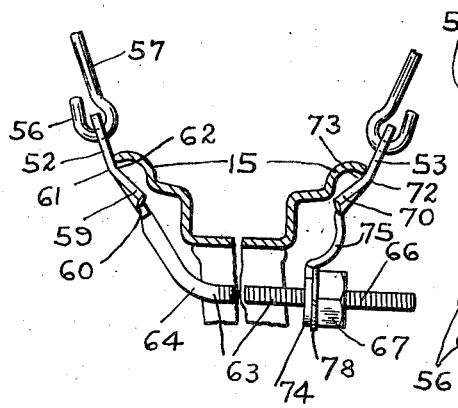
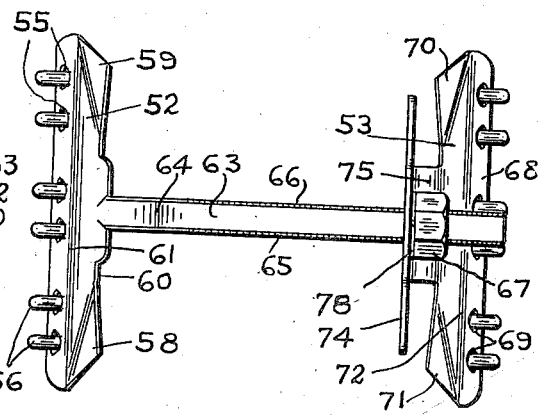
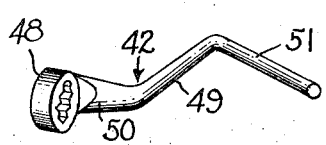
INVENTOR
Joseph N. Kirton.
BY H. G. Manning
ATTORNEYS Patented Aug. 12, 1941

2,252,429

UNITED STATES PATENT OFFICE 2,252,429

EMERGENCY TIRE CHAIN

Joseph N. Kirton, Yonkers, N. Y.

Application October 24, 1939, Serial No. 300,967

2 Claims. (Cl. 152—237)

This invention relates to tire traction devices, and more particularly to an emergency chain which is adapted to be readily and quickly attached to and detached from an automobile tire and wheel.

One object of this invention is to provide an improved form of emergency chain having a pair of oppositely disposed rim-clamping side members, a plurality of cross chains connected to both of said members, and means to clamp said side members rigidly upon the rim of the automobile wheel.

A further object of this invention is to provide an emergency traction device of the above nature which will be relatively simple in construction, inexpensive to manufacture, compact, pleasing in appearance, and very efficient and durable in use.

With these and other objects in view, which will appear as the description proceeds, there have been illustrated in the accompanying drawing, two forms in which the invention may be conveniently embodied in practice.

In the drawing:

Fig. 1 is a fragmentary front elevational view of a modified form of clamping means for an emergency tire chain as installed upon an automobile wheel.

Fig. 2 is a similar elevational view of the same as viewed from the rear.

Fig. 3 is a fragmentary end view of the same as it appears assembled upon a tire rim, the latter being shown in section.

Fig. 4 is a top plan view of the same shown separate from the tire and wheel.

Fig. 5 is a perspective view of a wrench tool adapted for use in rapidly attaching and detaching the emergency chain.

Referring now to the drawing wherein like reference numerals designate like parts throughout the several views, the chain-clamping means shown in Figs. 1 to 4 inclusive comprises an upper horizontal side plate 52 which is connected at its upper edge to another horizontal side plate 53 by a plurality of cross-chains 54. The side plates 52 and 53 are adapted to be located behind and in front of the tire, respectively, when the emergency chain is in assembled position. The plates 52 and 53, in this instance, are not identical in form—the rear plate 52 comprising an elongated relatively narrow strip having a sufficient number of round holes 55 adjacent its upper edge to receive the hook-shaped prongs 56 on the chain attaching links 57 of the chain 54. The corner portions 58 and 59 of the lower edge 60 of the plate 52 are struck inwardly to assist the gripping action of this plate upon the base of the tire or the side flanges 15 of the tire rim, and the entire upper plate 52 is slightly bent along its horizontal axis 61 to form a concave surface 62 for engaging the tire 10 or rim 15.

An elongated flat sided bar 63 is integrally secured, as by welding, to the lower edge 60 of the plate 52 and is bent at 64 at an angle of substantially 120 degrees thereto. The opposite side edges 65 and 66 of the flat bar 63 are screw-threaded to fit a locking nut 67.

The front plate 53 comprises an elongated horizontal upper portion 68 formed similarly to the rear plate 52, having holes 69 at its upper edge and inwardly struck rim-engaging lower edge corners 70 and 71, and said portion 68 is bent along its horizontal axis 72 to form a concave surface 73 similar to the surface 62. The front plate 53 has a lower tapered portion 74, which lower portion is connected to the upper portion 68 by an outwardly curved neck portion 75. A pair of enlarged round holes 76 and 77 are provided in the center of the lower tapered portion 74 and the neck portion 75, respectively, to selectively receive the outer end of the threaded bar 63 extending from the rear plate 52, when the plates and chains are assembled upon a tire and wheel, depending on the size and type of the wheel.

Operation

The wrench 42 (Fig. 10) is provided with a round nut-engaging head 48 which is offset from the shank 49 by an inclined section 50. A handle 51 is also provided which extends outwardly from the shank 49 to facilitate rotating the head 48.

In operation, the emergency chain shown in Figs. 1 to 4 inclusive may be readily applied to a tire by slipping the threaded bar 63 from the rear, forwardly through the wheel, passing the bar 63 through one of the holes 76 or 77 in the front plate 53, and then screwing the nut 67 upon the protruding end of the bar 63. A split spring lock washer 78 may, if desired, be first disposed between the nut 67 and the plate portion 74.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In an emergency tire chain, a rear plate for engaging the rim of the wheel behind the tire and having a small integral threaded bar extending through the central part of the wheel within said rim, a front plate for engaging said rim in front of the tire, said front plate having a reduced neck portion extending therefrom and located out of contact with said rim, said neck portion and front plate having a pair of spaced apertures respectively through which said threaded bar may be selectively passed, a plurality of cross chains for connecting the outer sides of said plates, and nut means on the outside of said front plate to lock it to said bar.

2. In an emergency tire chain, a rear plate for engaging the rim of the wheel behind the tire and having a small integral threaded bar extending through the central part of the wheel within said rim, a front plate for engaging said rim in front of the tire, said front plate having a reduced neck portion extending therefrom and located out of contact with said rim, a plurality of cross chains for connecting the outer sides of said plates, and nut means on the outside of said front plate to lock it to said bar.

JOSEPH N. KIRTON.